United States Patent [19]

Masica et al.

[11] Patent Number: 4,470,766
[45] Date of Patent: Sep. 11, 1984

[54] DEMAND RESPONSIVE HYDRAULIC PUMP

[75] Inventors: Michael T. Masica; Paul O. Wendler, both of Saginaw, Mich.

[73] Assignee: General Motors Corporation, Detroit, Mich.

[21] Appl. No.: 473,662

[22] Filed: Mar. 9, 1983

[51] Int. Cl.³ .................. F04B 49/02; F04B 49/08
[52] U.S. Cl. .................................. 417/299; 417/310
[58] Field of Search ............... 417/283, 284, 299, 310

[56] References Cited

U.S. PATENT DOCUMENTS 2,193,244 3/1940 Wolcott .............................. 417/299
2,362,724 11/1944 Shea ............................... 417/299 X Primary Examiner—Richard E. Gluck
Attorney, Agent, or Firm—Donald F. Scherer

[57] ABSTRACT

A hydraulic power steering system has a vane type pump which is operable to supply fluid to a steering gear at a volumetric rate determined in part by the system pressure or system demand. The pump flow is partially bypassed through a valve member disposed in the cam ring at a position adjacent the pumping chambers. The valve is spring loaded radially inward to permit the bypass flow at low system pressure levels. Increasing system pressure levels bias the valve member radially outward thereby reducing bypass flow while simultaneously increasing pump discharge flow. At a predetermined pressure level, the valve member will reach a secondary opening position to bypass fluid flow and thereby limit the maximum system pressure.

3 Claims, 1 Drawing Figure

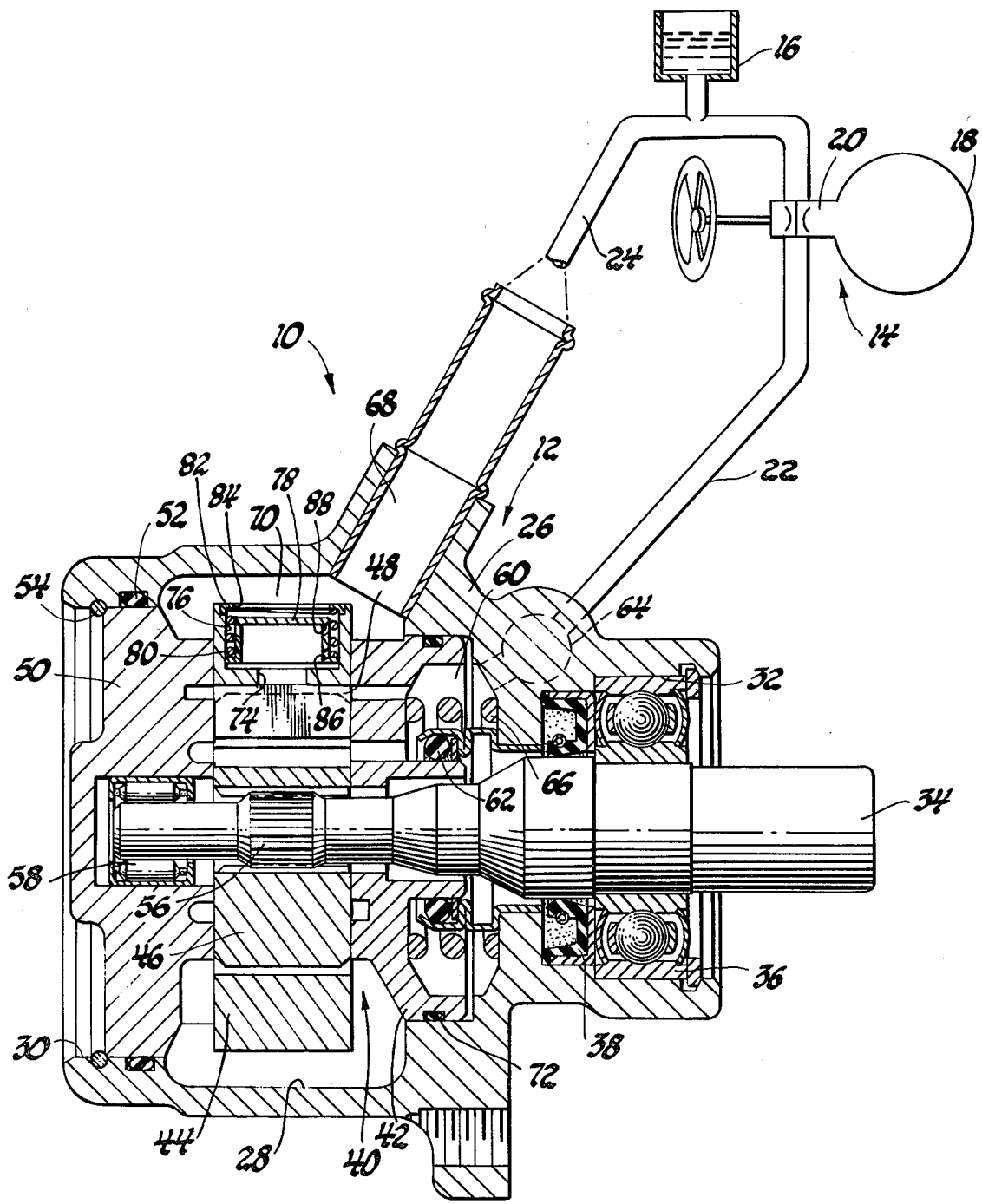

DEMAND RESPONSIVE HYDRAULIC PUMP

This invention relates to vane type hydraulic pumps and more particularly to such pumps having a demand responsive control valve mechanism incorporated therein.

When a vehicle is equipped with a power steering system, the hydraulic pump is a parasitic loss within the system whenever a turning maneuver is not occurring. Many efforts have been made to reduce these losses. These efforts have generally resulted in the use of flow controlled type pumps which limit the fluid volume delivered to the steering gear thereby limiting the back pressure within the system.

The present invention seeks to reduce the losses by reducing the flow to the steering gear whenever a steering demand is not present. When a steering demand occurs, the system will discharge the fluid required to satisfy the demand with the remaining fluid being bypassed. This differs from a flow controlled system in that the flow to the steering gear is continually limited regardless of demand.

It is an object of this invention to provide an improved vane type hydraulic pump for use in a power steering system wherein the pump incorporates a bypass valve mechanism having a valve member disposed in the pump cam ring to control direct fluid communication between the pump discharge chambers and the pump inlet and wherein the valve member is responsive to system pressure for movement radially outward to reduce the bypass flow area upon increasing system demand pressure to thereby increase the pump discharge flow to the system.

This and other objects and advantages of the present invention will be more apparent from the following description and drawing which is a cross-sectional elevational view of a vane type hydraulic pump disposed in a diagrammatic representation of a power steering system.

The power steering system 10 includes a vane type hydraulic pump, generally designated 12, a steering gear assembly, generally designated 14, and a fluid reservoir 16. The steering gear assembly 14 includes a power-assisted steering gear 18 and a steering valve 20. The steering gear assembly 14 may be constructed in accordance with the steering gear assembly shown in U.S. Pat. No. 3,022,772 issued Feb. 27, 1962, to Zeigler, and assigned to the assignee of this application.

The vane type pump 12 is connected through a pump discharge passage 22 to the steering valve 20 such that pressurized fluid from the pump 12 is delivered to the steering gear assembly 14. The steering valve 20 and reservoir 16 are both connected to the pump 12 through a pump return or inlet passage 24.

The vane type pump 12 includes a pump housing 26 having an internal housing cavity 28 with a large opening 30 at one end thereof and a smaller opening 32 at the other end thereof. A drive shaft 34 extends through the smaller opening 32 and is rotatably supported in a shaft bearing 36 which is secured in the opening 32 and is contacted by a shaft seal 38 also secured in the opening 32. The shaft seal 38 functions to prevent atmospheric air from entering the pump and low pressure fluid leakage from the pump.

The housing cavity 28 is substantially filled with a vane pump assembly, generally designated 40, and including a pressure plate 42, a cam ring 44, a rotor 46, a plurality of vanes 48, and an end cover and thrust plate 50. The end cover and thrust plate 50 cooperates with an annular seal ring 52 and a locking ring 54 to close the large opening 30.

The rotor 46 includes a plurality of slots in which the vanes 48 are slidably disposed in a well-known manner. The vanes 48 contact the inner surface of cam ring 44 so as to provide a plurality of peripheral pumping chambers which expand and contract upon the rotation of rotor 46 when it is driven through a spline connection 56 by the drive shaft 34.

The end cover and thrust plate 50 and pressure plate 42 establish the axial limits of the peripheral pump chambers and also includes pump inlet and discharge porting arrangements disposed in a well-known manner. The end cover and thrust plate 50 supports a shaft bearing 58 in which is rotatably supported the left end of drive shaft 34.

The discharge from the pumping chambers of the vane pump assembly 40 passes through pressure plate 42 to a discharge space 60 formed between the right end of cavity 28 and the left end surface of pressure plate 42. Leakage to the drive shaft 34 from the discharge space 60 is prevented by an annular seal ring 62. The discharge space 60 is in fluid communication with a pump discharge port 64 which in turn is in fluid communication with the pump discharge passage 22.

To ensure that the vane pump assembly 40 is urged into abutment with the locking ring 54, an assist spring 66 disposed in the discharge space 60 is provided. Thus, even at atmospheric pressure within the discharge space 60 there is a leftward force provided which continually urges the pump vane assembly toward the locking ring 54.

The pump inlet passage 24 is connected with a pump inlet port 68 which in turn communicates with an inlet space 70 which surrounds the cam ring 44 in the housing cavity 28. The inlet space 70 communicates fluid from the return passage 24 to the inlet porting of the vane pump assembly 40. The inlet space 70 is sealed from direct communication with the discharge space 60 by an annular seal ring 72 disposed in the pressure plate 42.

The cam ring 44 has an aperture 74 aligned with the discharge area of the pumping chambers formed by the vanes 48. The aperture 74 opens radially outward into an enlarged space 76 in which is slidably disposed a bypass valve 78. The bypass valve 78 is urged radially inward by a valve spring 80 so as to leave a large clearance between the outer edge of the valve 78 and a ring 82 which is disposed at the outer edge of space 76. The ring 82 has an inner circular dimension 84 designed to have a value clearance fit with the outer diameter of valve 78. The valve 78 has a plurality of bypass passages 86 and 88 formed therein with passages 88 being disposed radially outward from passages 86.

During pump operation when there is no steering demand present, the bypass valve 78 will assume the position shown. The discharge from the pumping chambers will be apportioned to flow partly through the aperture 74 and partly to the power steering system through passage 22.

The volume of fluid which flows through aperture 74 also flows through the bypass passages 86 and 88 and then between the outer surface of valve 78 and the ring 82 to be distributed to the inlet space 70. When the power steering system demand pressure increases due to a steering maneuver, the bypass valve 78 is urged radially outward due to the pressure differential thereon. As the bypass valve 78 moves outwardly, the space between ring 82 and valve 78 is reduced thereby reducing the bypass flow while increasing the pump discharge flow to passage 22.

The bypass valve 78 will, upon sufficient system pressure, extend through the ring 82 to permit the passages 88 to be connected directly to the inlet space 70, thus providing a pressure relief setting for the power steering system. The valve 78 moves incrementally outward with increases in system pressure such that the bypass flow is reduced while the discharge is increased. The proportion between these flows is determined in part by the system pressure required or demanded by the steering gear assembly 14.

The embodiments of the invention in which an exclusive property or privilege is claimed are defined as follows:

1. A demand responsive hydraulic fluid pump for a power steering system comprising; pump inlet port means; pump outlet port means for delivering pressurized fluid from the pump; vane pump means including a cam ring, a rotor, a pair of end plates and a plurality of vanes slidably disposed in said rotor and cooperating with said cam ring and said end plates to form a plurality of pumping chambers selectively alternately connectible with said pump inlet port means and said pump outlet port means; and differential pressure responsive demand valve means slidably disposed in said cam ring at a radial position in fluid communication with said pump inlet means and aligned with each pumping chamber when said pumping chamber is connected with said pump outlet port means for bypassing fluid from said pumping chambers to said pump inlet port means when the pressure demand at said pump outlet port means is below a predetermined level and for reducing the bypass fluid flow when the pressure demand is at or above said predetermined level.

2. A demand responsive hydraulic fluid pump for a power steering system comprising; pump inlet port means; pump outlet port means for delivering pressurized fluid from the pump; vane pump means including a cam ring, a rotor, a pair of end plates and a plurality of vanes slidably disposed in said rotor and cooperating with said cam ring and said end plates to form a plurality of pumping chambers selectively alternately connectible with said pump inlet port means and said pump outlet port means; and differential pressure responsive demand valve means including a valve member with plural bypass passages formed therein slidably disposed in said cam ring, and a ring member having a valve fit with said valve member, said ring member being disposed in said cam ring at a radial position in fluid communication with said pump inlet means and aligned with each pumping chamber when said pumping chamber is connected with said pump outlet port means for bypassing fluid from said pumping chambers to said pump inlet port means when the pressure demand at said pump outlet port means is below a predetermined level and for reducing the bypass fluid flow when the pressure demand is at or above said predetermined level, and said valve member extending partially through said ring member to hydraulically connect some of said bypass passages with the pump inlet to limit the maximum system pressure.

3. A demand responsive hydraulic fluid pump for a power steering system comprising; pump inlet port means; pump outlet port means for delivering pressurized fluid from the pump; vane pump means including a cam ring, a rotor, a pair of end plates and a plurality of vanes slidably disposed in said rotor and cooperating with said cam ring and said end plates to form a plurality of pumping chambers selectively alternately connectible with said pump inlet port means and said pump outlet port means; and differential pressure responsive demand valve means including a valve member with plural bypass passages formed therein slidably disposed in said cam ring, spring means urging said valve member radially inward, and a ring member having a valve fit with said valve member said ring member being disposed in said cam ring at a radial position in fluid communication with said pump inlet means and aligned with each pumping chamber when said pumping chamber is connected with said pump outlet port means for bypassing fluid from said pumping chambers to said pump inlet port means when the pressure demand at said pump outlet port means is below a predetermined level and for reducing the bypass fluid flow when the pressure demand is at or above said predetermined level, and said valve member extending partially through said ring member to hydraulically connect some of said bypass passages with the pump inlet to limit the maximum system pressure.

* * * * *